United States Patent
Baumann et al.

(10) Patent No.: US 7,533,889 B2
(45) Date of Patent: May 19, 2009

(54) FITTING DEVICE FOR A MACHINE TOOL WITH A TOOL HOLDER, AND A TOOL HOLDER

(75) Inventors: Otto Baumann, Leinfelden-Echterdingen (DE); Thomas Berndhardt, Aichtal-Groetzingen (DE); Hardy Schmid, Stuttgart (DE); Sven Kageler, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 350 days.

(21) Appl. No.: 10/563,190

(22) PCT Filed: Jun. 15, 2005

(86) PCT No.: PCT/EP2005/052762

§ 371 (c)(1),
(2), (4) Date: Jan. 3, 2006

(87) PCT Pub. No.: WO2006/010669

PCT Pub. Date: Feb. 2, 2006

(65) Prior Publication Data

US 2007/0110530 A1    May 17, 2007

(30) Foreign Application Priority Data

Jul. 28, 2004  (DE)  ........................ 10 2004 036 587

(51) Int. Cl.
*B23B 45/16* (2006.01)
*B25D 16/00* (2006.01)

(52) U.S. Cl. .................... 279/19.7; 279/19; 173/93.6

(58) Field of Classification Search .................... 279/19, 279/19.3, 19.4, 19.5, 19.6, 19.7, 157; 173/93.6
See application file for complete search history.

(56) References Cited

U.S. PATENT DOCUMENTS

| 4,133,394 | A | * | 1/1979 | Wohlwend | 173/210 |
| 4,592,560 | A | * | 6/1986 | Neumaier et al. | 279/81 |
| 5,199,833 | A | | 4/1993 | Fehrle et al. | |
| 5,437,465 | A | * | 8/1995 | Vogele et al. | 279/22 |
| 5,971,403 | A | * | 10/1999 | Yahagi et al. | 279/19.3 |
| 6,536,780 | B2 | * | 3/2003 | Baumann et al. | 279/19.4 |
| 7,028,786 | B2 | * | 4/2006 | Kuhnle et al. | 173/131 |
| 7,137,457 | B2 | * | 11/2006 | Frauhammer et al. | 173/29 |
| 2004/0011541 | A1 | | 1/2004 | Kuhnle et al. | |
| 2004/0245731 | A1 | | 12/2004 | Frauhammer et al. | |
| 2005/0093251 | A1 | * | 5/2005 | Buchholz et al. | 279/19 |
| 2005/0161242 | A1 | | 7/2005 | Frauhammer et al. | |
| 2005/0284648 | A1 | * | 12/2005 | Frauhammer et al. | 173/176 |

FOREIGN PATENT DOCUMENTS

| DE | 4328358 | | 3/1995 |
| DE | 196 21 610 | | 12/1997 |
| DE | 19805187 A1 | * | 8/1999 |
| DE | 10 2004 036 587.3 | * | 7/2004 |
| EP | 0 556 713 | | 8/1993 |

(Continued)

*Primary Examiner*—David P Bryant
*Assistant Examiner*—Eric A Gates
(74) *Attorney, Agent, or Firm*—Michael J. Striker

(57) ABSTRACT

A fitting device for a machine tool has a tool holder for a hand-guided machine tool, for receiving insertion tools. The tool holder forms a releasable sliding fit with a drive tube.

14 Claims, 3 Drawing Sheets

FOREIGN PATENT DOCUMENTS

| | | |
|---|---|---|
| EP | 0 891 831 | 1/1999 |
| GB | 2 281 244 | 3/1995 |
| GB | 2 313 566 | 12/1997 |
| GB | 2333980 A * | 8/1999 |
| JP | 10058352 A * | 3/1998 |

* cited by examiner

FITTING DEVICE FOR A MACHINE TOOL WITH A TOOL HOLDER, AND A TOOL HOLDER

CROSS-REFERENCE TO RELATED APPLICATIONS

This application claims priority to German patent application No. 10 2004036587.3, filed 28 Jul. 2004.

BACKGROUND OF THE INVENTION

The present invention is directed to a fitting device for a machine tool with a tool holder, and a tool holder.

Rotary and percussion hammers are provided with fitting devices for insertion tools. They are subject to a relatively great deal of wear resulting from their operation, however. Wear of the driving-element profile of a tool holder is a common cause of failure. The machine tool must then undergo expensive service or it must be scrapped if the repair costs are too high.

BRIEF SUMMARY OF THE INVENTION

With a fitting device—according to the present invention—for a machine tool, in particular for a hand-guided machine tool with a tool holder for receiving insertion tools, it is provided that the tool holder forms a releasable sliding fit with a drive tube. The drive tube is preferably a rotary and/or percussion drive, in particular a hammer tube. This enables exact concentricity of the insertion tool. If the driving-element profile of the tool holder is defective, the sliding fit can be released and the tool holder can be easily replaced. Preferably, a guide diameter of the tool holder, e.g., for receiving a change chuck, is located inside a transmission region of the machine tool and is protected against dust and wear.

To reliably transfer torque, the tool holder is advantageously non-rotatably connected with the drive tube. In a first preferred embodiment, locking elements, e.g., pins which can be positioned tangentially or radially, can be provided for this purpose. Spherical locking elements can also be provided. An axial fixing of the tool holder with respect to the drive tube can thereby be attained. Likewise, in a second preferred embodiment, the tool holder can have a non-rotatable cross section, e.g., a polygonal configuration, it being advantageously possible for axial fastening to also be provided. With a machine tool with percussive operation, it is then possible to accommodate no-load strokes, e.g., when transitioning from percussive operation to no-load operation.

The tool holder is preferably connectable with the drive tube around its outer diameter. One advantage is that one or more locking elements can be accessible outside of a transmission housing, and the tool holder can be replaced without opening the machine tool.

If the tool holder is connectable with the drive tube around its outer diameter, it is very favorable when the tool holder is capable of being fastened axially with at least one locking element in the drive tube, the locking element being accessible from the outside of the drive tube. This enables quick and easy release and replacement of the tool holder and cost-effective repair work. A replacement assembly required for repair is affordable, because only the tool holder and locking element(s) need be replaced.

Advantageously, the at least one locking element is captively containable on the outer diameter of the drive tube. This can take place using a typical protective sleeve that encloses the drive tube. Additional fastening is not necessary. As an alternative, a suitably located fastening means, such as a snap ring, a spring element, a retaining ring or the like can be provided.

In an alternative embodiment, the tool holder can also enclose the drive tube. In this case, a corresponding locking element(s) is/are contained on the outer diameter of the tool holder using the aforementioned protective sleeve or the aforementioned fastening means.

Advantageously, a guide diameter of the tool holder is located inside a transmission of the machine tool such that it is essentially protected from dust.

For a tool holder for a fitting device of a machine tool, in particular for a hand-guided power tool, it is provided that it includes means in its outer wall to bring about an axial and/or radial fastening in the installed state. The tool holder preferably has a non-rotatable cross section, e.g., a polygonal cross section. The overall length of the tool holder can be designed shorter than that of known, typical change-chuck designs.

Preferably, at least one bore hole is provided on the circumference for receiving at least one locking element in the installed state. The bore hole can be located such that the locking element(s) can be positioned axially or, as an alternative, tangentially.

The present invention is particularly suited for machine tools, e.g., power tools, that have insertion tools driven in a rotating and/or percussive manner, in particular for rotary hammers, percussion hammers, chisel hammers or the like.

Further embodiments, aspects and advantages of the present invention also result independently of their wording in the claims, without limitation to generality, from exemplary embodiments of the present invention presented below with reference to the drawings.

DETAILED DESCRIPTION OF THE EXEMPLARY EMBODIMENT

Figure 1:
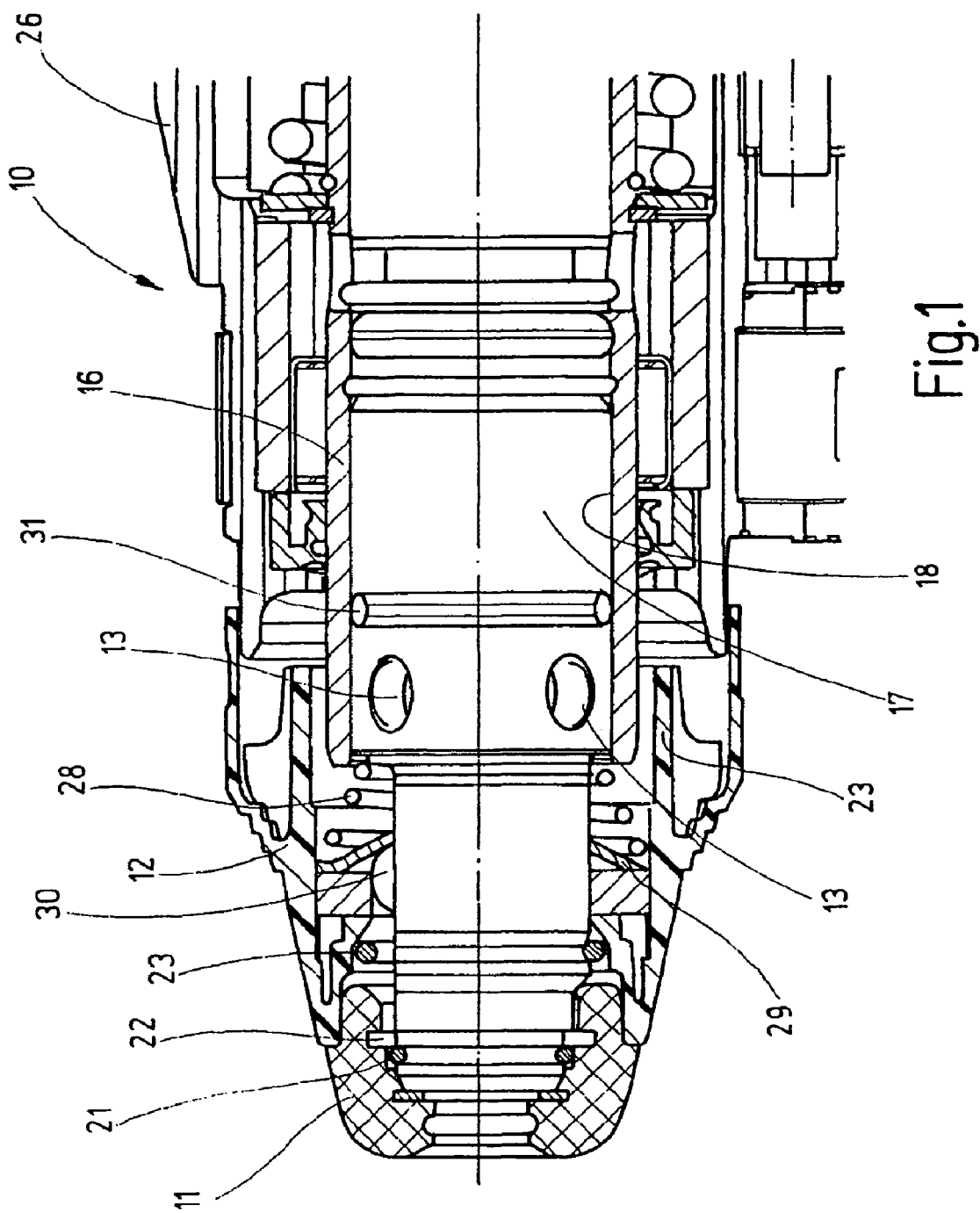
FIG. 1 Shows a partial cross-section through a transmission region of a preferred power tool.
Figure 2:
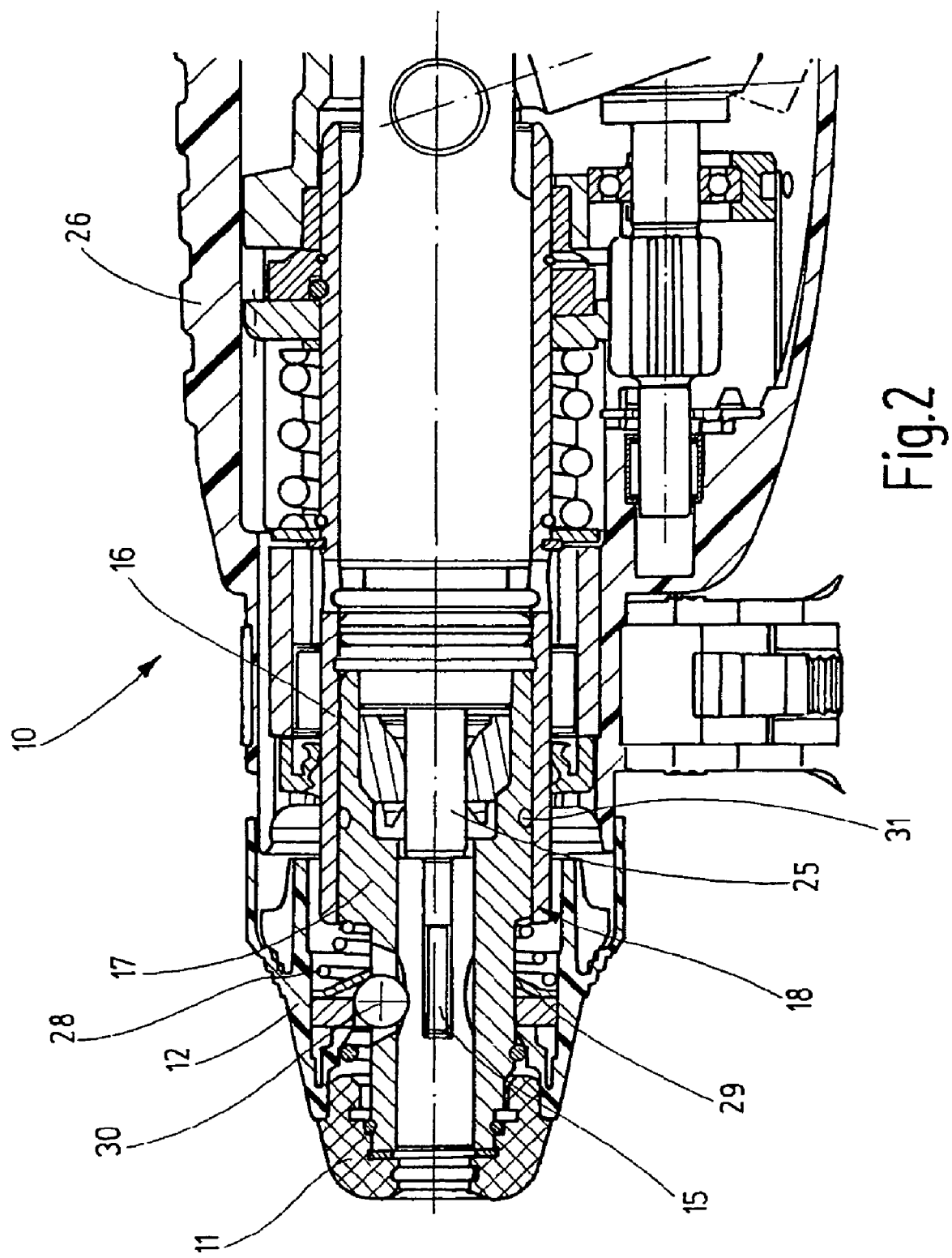
FIG. 2 Shows a further partial cross-section through a transmission region of a preferred power tool with details of a preferred tool holder.

FIGS. 1 through 3 show a preferred tool holder 17 in a fitting device for an insertion tool (not shown) of a preferred machine tool 10 designed as a rotary hammer, in various views.

FIG. 1 shows a partial cross-section through a transmission region of preferred machine tool 10 with a housing 26 and a fitting device located in housing 26, the fitting device enclosing tool holder 17. Tool holder 17 is designed for receiving insertion tools that can be inserted from the side of the fitting device covered with a cap 11.

Tool holder 17 forms a sliding fit 18 with a drive tube 16 designed as a hammer tube, and is partially covered by this drive tube 16. In the region of its free end, tool holder 17 is located inside a protective sleeve 12 that is closed with a cap 11. Two bore holes 13 are shown on the circumference of tool holder 17, which serve to axially fix and non-rotatably connect tool holder 17 with drive tube 16. A total of four bore holes 13 are located on the circumference of tool holder 17. More or fewer bore holes 13 can also be provided, of course.

Bore holes 13 are covered by an internal ring 23 of protective sleeve 12. Tool holder 17 is retained with a spring 28 between retaining ring 29 and the end face of drive tube 16, retaining ring 29 bearing against a shoulder of protective sleeve 12 and holding a bearing 30 that is clamped between retaining ring 29 and the shoulder. A gasket 31 is located between tool holder 17 and drive tube 16 on tool holder 17 in the region of sliding fit 18.

A further depiction of tool holder 17 in the inserted position is explained in greater detail in FIG. 2. FIG. 2 shows a further cross section through the transmission region of machine tool 10 in FIG. 1, with details of preferred tool holder 17. Tool holder 17 is connected with drive tube 16 around its outer diameter and forms sliding fit 18 with drive tube 16. A driving-element profile 15 that is susceptible to wear is located inside the tool fitting such that an insertion tool (not shown) extends up to a striking pin 25 of drive tube 16 configured as a hammer tube. The insertion tool can therefore be driven in a rotary and/or percussive manner.

Figure 3A:
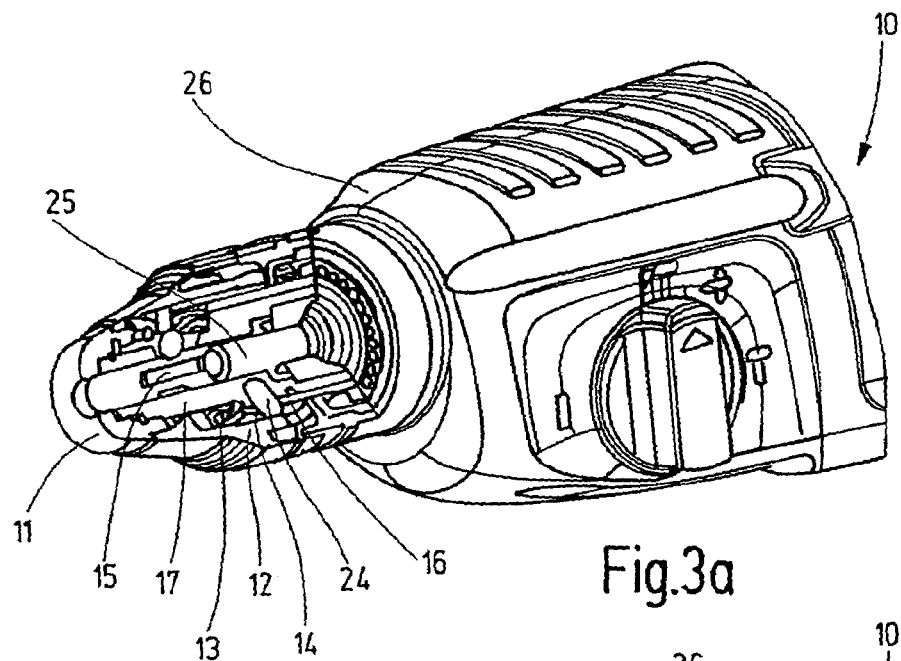
FIGS. 3*a, b* Show a partial cross-section of a tool holder in the installed state (a) and, in an exploded view, they show the steps involved in removing the detachable, preferred tool holder (b).

FIGS. 3a and b show a partial cross-section of the aforementioned tool holder in the installed state at an angle from the front and, in an exploded view, they show the steps involved in removing detachable, preferred tool holder 17.

A locking element 24 is shown close to the free end of striking pin 25, locking element 24 being inserted in a bore hole 14 of drive tube 16 and in bore hole 13—designed as a blind hole—of tool holder 17 such that tool holder 17 is secured axially and non-rotatably with locking element 24, which is accessible from an outer side of drive tube 16. Locking element 24 and/or all four locking elements 24 are contained by inner ring 23 of protective sleeve 12.

Figure 3B:
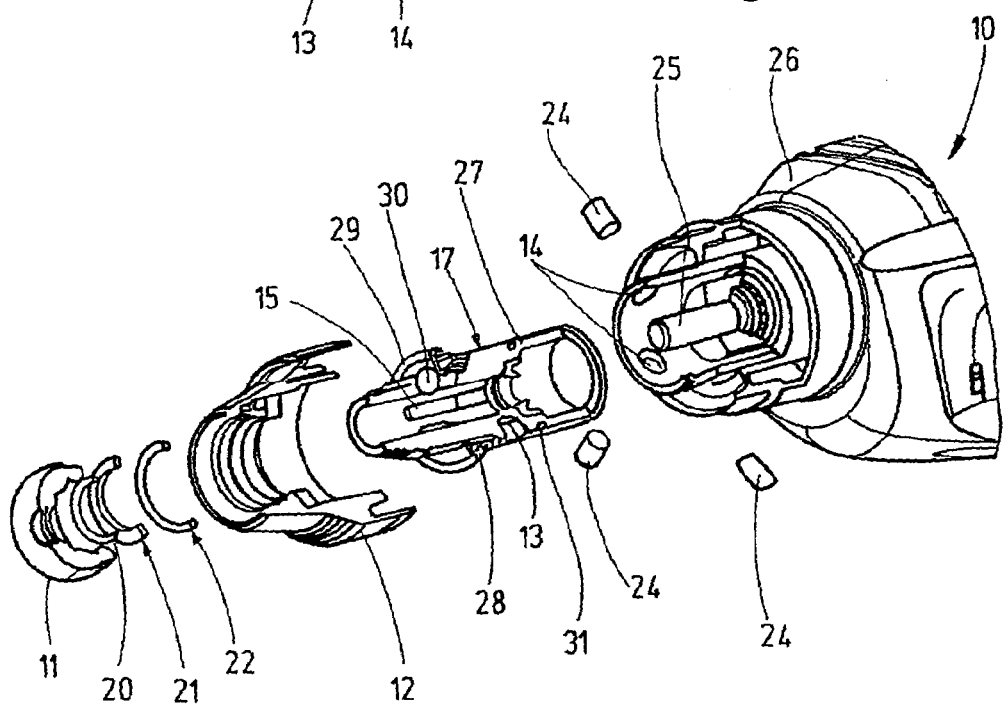

As shown in FIG. 3b, tool holder 17 can be easily removed and, if necessary, replaced. First, cap 11 is pulled off with the elements located behind it, i.e., a ring 20, a disk 21, and a ring 22. Rings 20, 22 are advantageously removed using pliers. It is then possible to remove protective sleeve 12. Locking elements 24 are released as a result, locking elements 24 extending through bore holes 14 of drive tube 16 into bore holes 13 of tool holder 17; they can also be removed using pliers. Tool holder 17, along with spring 28, retaining ring 29, bearing 30 and gasket 31 located thereon, can then be pulled out and replaced, if necessary. Tool holder 17 is a compact unit with spring 28, retaining ring 29, bearing 30 and gasket 31.

Once tool holder 17 is removed, striking pin 25—which is now exposed—can be replaced, along with the no-load operation ring.

What is claimed is:

1. A fitting device for a removable tool holder (17) for receiving insertion tools of a machine tool (10) comprising: a protective sleeve (12) arranged around the tool holder (17) that forms a releasable sliding fit (18) with a drive tube (16); and at least one locking element (24) securing the tool holder (17); whereby the locking element (24) is oriented in a direction perpendicular to said sliding fit (18) so that for removing the tool holder (17) from the fitting device the protective sleeve (12) of the tool holder (17) is removed, then the at least one locking element (24) is completely removed, and then the tool holder (17) is separated from the fitting device, wherein the tool holder (17) and the drive tube (16) have bore holes (13, 14) extending in the direction perpendicular to the sliding fit (18) and aligned with one another, and the locking element (24) is inserted in the bore holes (13, 14) of the tool holder (17) and the drive tube (16).

2. The fitting device of claim 1, further comprising at least one cap (11) closing the protective sleeve (12) and so that for removing the tool holder (17) from the fitting device the at least one cap (11) is removed before removing the protective sleeve (12).

3. The fitting device of claim 2, further comprising at least one first ring (20) located behind the at least one cap (11) and so that for removing the tool holder (17) from the fitting device the at least one first ring (20) is removed after removing the at least one cap (11).

4. The fitting device of claim 3, further comprising at least one disk (21) located behind the at least one first ring (20) so that for removing the tool holder (17) from the fitting device the at least one disk (21) is removed after removing the at least one first ring (20).

5. The fitting device of claim 4 further comprising at least one second ring (22) located behind the at least one disk (21) so that for removing the tool holder (17) from the fitting device the at least one second ring (22) is removed after removing the at least one disk (21).

6. The fitting device of claim 1 wherein the tool holder (17) is non-rotatably connectable with the drive tube (16).

7. The fitting device of claim 1, wherein the tool holder (17) is fixable axially relative to the drive tube (16).

8. The fitting device of claim 1, wherein the tool holder (17) is connectable with the drive tube (16) around its outer diameter.

9. The fitting device of claim 8, wherein the tool holder (17) is securable axially in the drive tube (16) with the at least one locking element (24) and wherein the at least one locking element (24) is accessible from an outer side of the drive tube (16).

10. The fitting device of claim 9, wherein the at least one locking element (24) is captively contained on an outer diameter of the drive tube (16).

11. The fitting device of claim 1, wherein the tool holder (17) is enclosed by the drive tube (16).

12. The fitting device of claim 1, wherein the tool holder (17) has a guide diameter locatable inside a transmission of the machine tool (10) such that it is essentially protected from dust.

13. The fitting device of claim 1, wherein the at least one locking element (24) is a cylindrical pin.

14. A fitting device for a removable tool holder (17) for receiving insertion tools of a machine tool (10) comprising:
a protective sleeve (12), a tool holder (17), a drive tube (16), four locking elements (24), and an internal ring (23) in protective sleeve (12) wherein:
the protective sleeve (12) is arranged around the tool holder (17),
the tool holder (17) forms a releasable sliding fit (18) with the drive tube (16),
four bore holes (14) are located in the drive tube (16),
four bore holes (13) are located on a circumference of the tool holder (17),
the four locking elements (24) are cylindrical pins insertable into the bore holes (14) of drive tube (16) and the bore holes (13) of tool holder (17) securing the tool holder (17), and
the four bore holes (13) on a circumference of the tool holder (17) are covered by the internal ring (23) of the protective sleeve (12) so that:
for removing the machine tool holder (17) from the fitting device the protective sleeve (12) of the tool holder (17) is removed, then the four locking elements (24) are completely removed, and then the tool holder (17) is separated from the fitting device.

* * * * *